United States Patent
Bergua (10) Patent No.: US 10,392,082 B2
(45) Date of Patent: Aug. 27, 2019

(54) FLOATING OFFSHORE STRUCTURES

(71) Applicant: ALSTOM RENEWABLE TECHNOLOGIES, Grenoble (FR)

(72) Inventor: Roger Bergua, Barcelona (ES)

(73) Assignee: GE RENEWABLE TECHNOLOGIES WIND B.V., Brada (NL)

( * ) Notice: Subject to any disclaimer, the term of this patent is extended or adjusted under 35 U.S.C. 154(b) by 937 days.

(21) Appl. No.: 14/777,727

(22) PCT Filed: Mar. 26, 2014

(86) PCT No.: PCT/EP2014/056052
§ 371 (c)(1),
(2) Date: Sep. 16, 2015

(87) PCT Pub. No.: WO2014/154744
PCT Pub. Date: Oct. 2, 2014

(65) Prior Publication Data
US 2016/0229494 A1    Aug. 11, 2016

(30) Foreign Application Priority Data
Mar. 28, 2013 (EP) ................... 13382123

(51) Int. Cl.
| | | |
|---|---|---|
| *B63B 22/20* | (2006.01) | |
| *B63B 21/50* | (2006.01) | |
| *F03D 13/20* | (2016.01) | |
| *F03D 13/25* | (2016.01) | |

(Continued)

(52) U.S. Cl.
CPC .............. *B63B 22/20* (2013.01); *B63B 21/50* (2013.01); *B63B 21/502* (2013.01); *B63B 35/44* (2013.01);

(Continued)

(58) Field of Classification Search
CPC ....................................... B63B 22/20
(Continued)

(56) References Cited

U.S. PATENT DOCUMENTS

| | | | |
|---|---|---|---|
| 2011/0174206 A1* | 7/2011 | Kupersnnith; John A | .................. B63B 35/44 114/125 |
| 2015/0204045 A1* | 7/2015 | Betran Palomas | ... E02D 27/425 290/55 |
| 2016/0229494 A1* | 8/2016 | Bergua | .................. B63B 21/502 |

FOREIGN PATENT DOCUMENTS

| | | | |
|---|---|---|---|
| EP | 2 639 452 | 9/2013 | |
| EP | 2783975 A1 * | 10/2014 | ........... B63B 21/502 |

(Continued)

OTHER PUBLICATIONS

International Search Report and Written Opinion for PCT/EP2014/056052, dated May 13, 2014, 9 pgs.

*Primary Examiner* — Lars A Olson
*Assistant Examiner* — Jovon E Hayes
(74) *Attorney, Agent, or Firm* — Dority & Manning, P.A.

(57) ABSTRACT

Methods for controlling tension in mooring lines of a floating offshore structure having a buoyancy structure including one or more water tanks and the buoyancy structure providing excess buoyancy are provided. The methods comprise varying the mass and/or the center of gravity of the floating offshore structure by varying the quantity of water in one or more of the water tanks. Also, floating offshore structures are disclosed, the structures comprising a buoyancy structure having one or more floater tanks providing excess buoyancy, and a plurality of tensioned mooring lines, and further comprising a control system for increasing and decreasing a quantity of water in one or more of the floater tanks. Also, possible uses of floating offshore structures are provided wherein under standard operating conditions, the floater tanks are at least partially filled with water.

17 Claims, 9 Drawing Sheets

(51) Int. Cl.
   *B63B 35/44* (2006.01)
   *E02B 17/00* (2006.01)

(52) U.S. Cl.
   CPC ............ *F03D 13/22* (2016.05); *F03D 13/25* (2016.05); *B63B 2035/446* (2013.01); *E02B 2017/0091* (2013.01); *F05B 2240/93* (2013.01); *F05B 2240/95* (2013.01); *Y02E 10/727* (2013.01)

(58) Field of Classification Search
   USPC ........................................................ 114/125
   See application file for complete search history.

(56) References Cited

FOREIGN PATENT DOCUMENTS

| | | | |
|---|---|---|---|
| EP | -2783975 A1 * | 10/2014 | |
| GB | 2 378 679 | 2/2003 | |
| WO | WO 03/004869 | 1/2003 | |
| WO | WO 2005/021961 | 3/2005 | |
| WO | WO 2010/021655 | 2/2010 | |
| WO | WO 2010021655 A2 * | 2/2010 | ............ F03D 1/001 |
| WO | WO-2010021655 A2 * | 2/2010 | ............ F03D 13/25 |
| WO | WO -2010021655 A2 * | 2/2010 | |
| WO | WO 2011092437 A1 * | 8/2011 | ............ B63B 9/065 |
| WO | WO -2011092437 A1 * | 8/2011 | |
| WO | WO 2012/051382 | 4/2012 | |
| WO | WO 2012051382 A1 * | 4/2012 | ............ F03B 17/061 |
| WO | WO -2012051382 A1 * | 4/2012 | |
| WO | WO -2012094261 A3 * | 10/2012 | |
| WO | WO 2012094261 A3 * | 10/2012 | ............... B63B 3/38 |
| WO | WO -2013048257 A1 * | 4/2013 | |
| WO | WO 2013048257 A1 * | 4/2013 | ........... E04H 12/187 |
| WO | WO 2013135291 A1 * | 9/2013 | ........... F03D 7/0204 |
| WO | WO -2013135291 A1 * | 9/2013 | |

* cited by examiner

FLOATING OFFSHORE STRUCTURES

This application claims the benefit of European Patent Application EP13382123.1 filed 28 Mar. 2013.

The present disclosure relates to floating offshore structures.

BACKGROUND ART

Floating offshore structures such as e.g. oil platforms, offshore wind turbines, and offshore meteorological towers are known.

Several configurations have been proposed for the floating or buoyancy structures: many of these employ floater elements in the form of substantially hollow floater tanks that in use are arranged substantially below the mean sea level and provide a buoyancy force to support the structure, e.g. a wind turbine. Ballast and/or mooring lines anchored to the seabed are provided for achieving stability.

In some of these floating structures, the buoyancy structure is designed to provide an excess buoyancy force and is maintained floating under the mean sea level by taut mooring lines tensioned by the excess buoyancy force.

For example, concepts have been developed such as the "Taught Leg Buoy" (TLB) floating wind turbine, with a slender cylindrical buoy and two sets of tensioned mooring lines, inclined relative to the seabed and connected to gravity anchors and to the buoy; or such as the "Tension Leg Platform" (TLP) floating wind turbine, in which the tensioned mooring lines are substantially vertical and are connected between gravity anchors on the seabed and arms or braces extending radially outwards with respect to the vertical axis of the wind turbine. The TLP arms may be part of the buoyancy structure, for example in the form of hollow spokes that extend radially outward from a hollow central hub, or may be arranged above the sea level, in which case the buoy may be a slender cylindrical tank like in the TLB concept.

TLP structures are also used for offshore oil platforms. Other configurations for offshore structures are not based on providing an excess buoyancy force and tensioned mooring lines for their stability, but instead on having a ballast at a relatively point of the structure. The resulting centre of gravity may thus be located at a relatively low point of the structure as well. As such, the resulting structure may be inherently stable and does not depend on the tensioned mooring lines for stability.

The buoyancy structures of offshore structures are subject to several loads, such as for example the weight of the wind turbine itself, impacts, forces exerted by waves, currents and tides, and, in case of a wind turbine, also aerodynamic forces associated to the wind, rotor rotation, etc.

As mentioned before, the offshore structures that rely on excess buoyancy for stability have tensioned mooring lines or cables. In order for these structures to be stable, the mooring lines must always be under tension, otherwise the offshore structure could become unstable and could fall over. Since the loads on the offshore structures, and particularly on a floating wind turbine may vary considerably both in magnitude and direction, a high amount of excess buoyancy and high tension in the cables may be required.

Having a high tension in the mooring lines or cables means that the cross-sectional area of the cables needs to be increased as well. The resulting cables may thus be heavy and expensive. Additionally, having such a high tension in the cables may result in the rest of the structure to be dimensioned accordingly. Also the other parts of the structure may become heavier and more expensive.

An alternative solution would be to have a high number of lines for providing stability and distributed in such a way that even if some of them could in certain circumstances enter in compression, the other lines would still be able to maintain the stability of the offshore structure. However, also this solution can become very expensive.

There thus exists a need for a floating offshore structure that reduces or resolves at least some of the afore-mentioned problems.

SUMMARY

In accordance with a first aspect, a method for controlling tension in mooring lines of a floating offshore structure having a buoyancy structure including one or more water tanks and the buoyancy structure providing excess buoyancy is provided. The method comprises varying the mass and/or the centre of gravity of the floating offshore structure by varying the quantity of water in one or more of the water tanks.

By varying the mass of the floating offshore structure, the excess buoyancy of the structure can be controlled. By controlling the excess buoyancy, the tension of the mooring lines can also be controlled. When needed, the tension of the cables may be increased, without a need for always having a high tension. The resulting offshore structure may thus become safer, as it may become more stable. Alternatively or additionally, the resulting offshore structure may be cheaper.

In accordance with this first aspect, a method for controlling the stability of such a floating offshore structure is provided.

In this regard, the expression "mooring lines" is to cover e.g. cables, chains, ropes, wires or similar used for mooring a floating structure.

The tension in one or more of the mooring lines may also be changed by changing the centre of gravity of the structure. By emptying or filling the water tanks in one or more specific locations of the offshore structure, the centre of gravity can be shifted.

It is furthermore possible to change the mass of the structure and the centre of gravity of the structure at the same time.

In some examples, the mass of the floating offshore structure may be varied in response to one or more loads on the structure. Such loads may include e.g. oscillations. The loads may be measured in a variety of ways. One possibility is to measure the tension in the mooring lines and in response to such measurements the mass of the floating offshore structure may be varied.

By changing the mass of the offshore structure, also the natural frequency of the structure may be varied. Changing the mass of the offshore structure may be a way of avoiding resonance.

In some examples, the floating offshore structure may comprise a wind turbine. Such floating offshore wind turbines may comprise a tension leg platform structure or a taught leg buoy structure. In other examples, the floating offshore structure may be a floating meteorological tower, an offshore oil platform, a floating bridge, a floating breakwater structure, a floating LPG terminal or other.

In another aspect, a floating offshore structure is provided comprising a buoyancy structure having one or more water tanks providing excess buoyancy, and a plurality of tensioned mooring lines. The floating offshore structure further comprises a control system for increasing and decreasing a quantity of water in one or more of the water tanks.

In accordance with this aspect, a floating offshore structure may be provided that may be stable and of relatively low cost.

In some examples, floating offshore structure may comprise one or more sensors to measure the tension in one or more of the mooring lines. Measuring the tension of the mooring lines is one of the possibilities for measuring loads on the offshore structure. The tension of the mooring lines gives very valuable information about the (in)stability of the structure. In some examples, the control system may be adapted to adjust the quantity of water in one or more of the water tanks in response to a measured tension in one or more of the mooring lines.

In some examples, the water tanks may comprise at least one one-way valve for increasing the quantity of water in the water tank and at least one-way valve for decreasing the quantity of water in the water tank. The arrangement of one-way valves is a manner for filling and emptying tanks that may reduce the complexity.

In some examples, one or more of the water tanks may comprise two or more partitions. An aspect of partitioning water tanks is that an increased control and flexibility may be provided. The partitioning of the water tanks may be used to increase or decrease the mass at a precisely selected point. A change in centre of gravity may thus be achieved.

In yet another aspect, a use of a floating offshore structure substantially as hereinbefore described is provided, wherein under standard operating conditions, the water tanks are at least partially filled with water. In order to be able to react adequately to largely varying loads, it is preferable that under "standard conditions" (i.e. normal operating conditions with normal loads, in particular no loads that represent design load cases, and e.g. at medium sea level) the tanks are at least partially filled. In response to changing loads, the tanks can thus be emptied or filled as needed.

Preferably, under standard operating conditions, the volume of the water tanks is between 25%-75% filled with water, preferably between 40%-60% filled with water, and more preferably around 50% filled with water. When half of the total available volume of the water tanks is occupied under standard conditions, this provides most flexibility for changing the mass both upwards and downwards.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION

Figure 1A:
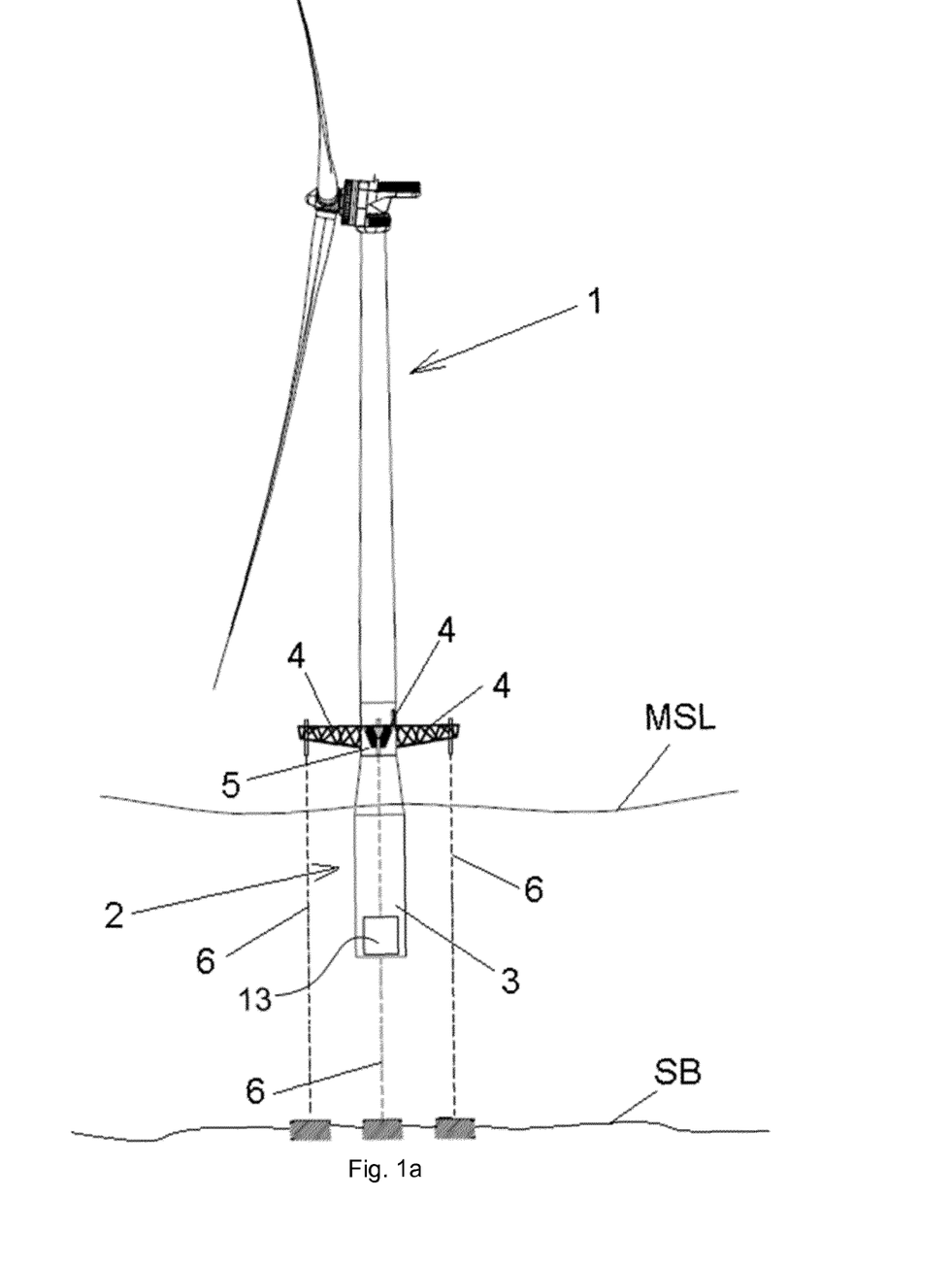
FIG. 1a schematically illustrates a side view of an example of an offshore floating wind turbine.
Figure 1B:
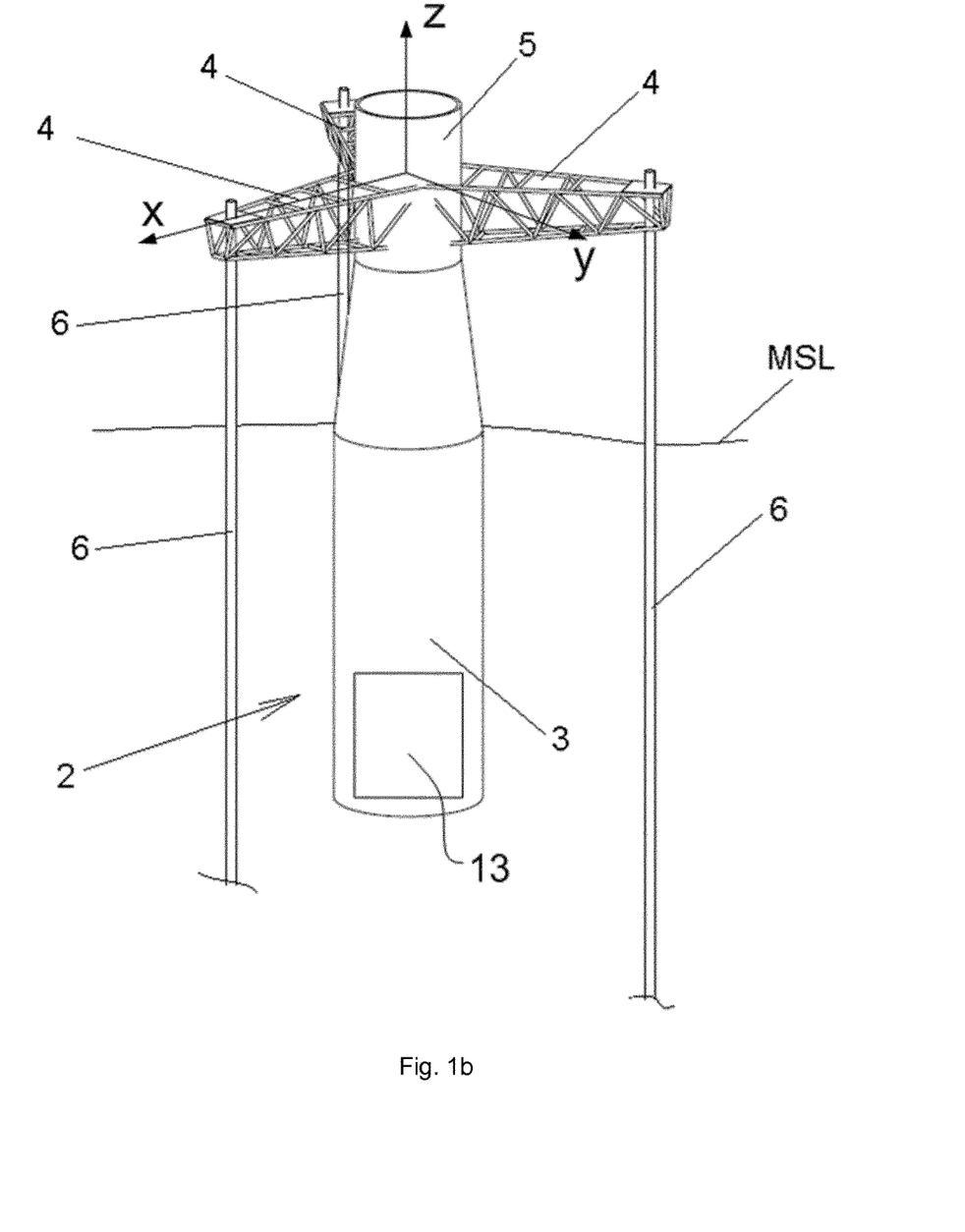
FIG. 1b shows schematically in perspective view an enlarged detail of the wind turbine of FIG. 1a FIG. 1c schematically illustrates in perspective view a detail of a different wind turbine configuration to which examples of the present invention may be applied.

FIGS. 1a and 1b show an example of an offshore wind turbine, and more particularly a floating wind turbine of the TLP (Tension Leg Platform) type.

The wind turbine 1 may comprise a buoyancy structure 2, with at least one floater tank 3. The buoyancy structure 2 may be designed such as to remain submerged in a position above the sea bed SB and below the mean sea level MSL, to provide an upward thrust for supporting the weight of the wind turbine and other loads.

In order to stabilize a floating wind turbine with such a buoyancy structure, ie in order to restrain within acceptable limits its 6 degrees of freedom (surge, sway, heave, pitch, roll and yaw), the mooring lines are put under tension by the excess buoyancy provided by the floater tanks.

Examples of the present invention may also be applied to taught leg buoy (TLB) wind turbines and other offshore structures. In particular, examples of the present invention may be applied to any offshore structure with tensioned mooring lines and excess buoyancy.

The floater tank 3 may have a substantially cylindrical shape, such as shown in FIGS. 1a and 1b, and may have a diameter that is smaller than its length. For example, the floater tank 3 may be around 20 m in length and have a diameter of between 6 and 12 m. This kind of buoyancy structures are sometimes referred to as "spar-buoy".

The floater tank 3 may have a central geometric axis (here the vertical axis of the cylinder), and the floater tank may be arranged such that this axis is substantially or generally aligned with the axis of the wind turbine tower, i.e. the cylindrical floater tank 3 may be arranged substantially under the wind turbine, as shown.

The wind turbine may be provided with three braces 4, extending radially outward from a wind turbine tower supporting structure 5, at a height above the mean sea level; a mooring line 6 may be attached to each of the braces 4 at one end and to the seabed at the other end. The supporting structure 5 is arranged between the buoyancy structure and the tower of the wind turbine; in some configurations, such a supporting structure is known as "transition piece".

Further mooring lines (not shown) may be arranged between the lower end of the floater tank and the sea bed, and/or mooring lines may be attached to the sea bed in such positions as to be inclined instead of vertical.

In alternative examples, more than three braces may also be provided. Three braces (each separated by a 120° angle) with mooring lines are able to provide dynamic stability regardless of wind direction, direction of waves, tidal flow etc.

The buoyancy structure, and in this example, the floater tank in particular may comprise one or more water tanks 13 and a control system for increasing and decreasing a quantity of water in the water tanks in accordance with circumstances. The control system may include a suitable arrangement of valves and pumps and may respond to load measurements. Loads on the wind turbine may be measured by sensors arranged in the nacelle, blades or tower of the wind turbine.

One aspect of a wind turbine with the structure shown in FIGS. 1a and 1b is that in this case the design of the buoyancy structure does not need to take into account all the loads arising in a wind turbine: wind loads, for example, are transmitted from the tower to the braces 4 of the supporting structure 5 and from here to the mooring lines 6. Wave loads are equally transmitted through the buoyancy structure to the braces and mooring lines.

A suitable way of controlling the water in the water tank(s), and thereby the excess buoyancy may be in response to tension(s) measured in the cables. This gives very direct information about the potential stability of the structure. For example, if the tension in one or more of the cables is below a predetermined threshold, the water tank(s) may be emptied in order to increase the excess buoyancy and the tension in the mooring lines. On the other hand, if the tension in one or more of the cables is above a predetermined threshold, the excess buoyancy may be lowered by increasing the mass of the structure, i.e. by adding water.

Alternative forms of control taking into account predetermined thresholds or not are possible. In any case, by controlling the mass of the structure, the excess buoyancy and the tension in the mooring lines may be controlled in a relatively easy manner. Advantageously, in offshore structures, the medium that may be used for changing the mass of the structure, water, is readily available.

The floater tank 3 may be transported empty, or containing water. Upon installation, the floater tanks may be only partially deballasted. The resulting excess buoyancy (buoyancy-weight) may be precisely controlled. In standard operating conditions, the water tank(s) of the floater tank may be approximately 50% full, in order to provide both downwards and upwards flexibility for the mass of the structure.

Further shown in FIG. 1b is a reference coordinate system. The x-axis may correspond to the prevailing wind direction at any given moment. This direction thus corresponds substantially to the orientation of the wind turbine rotor. The z-axis may correspond to the longitudinal axis of the wind turbine tower. The y-axis may be defined as being perpendicular to both the x-axis and the z-axis.

It is to be noted that even though in FIG. 1b, the x-axis is substantially parallel to one of the braces 8, this is not necessarily the case, as the x-axis may depend on the wind direction, not on the structure itself.

Figure 1C:
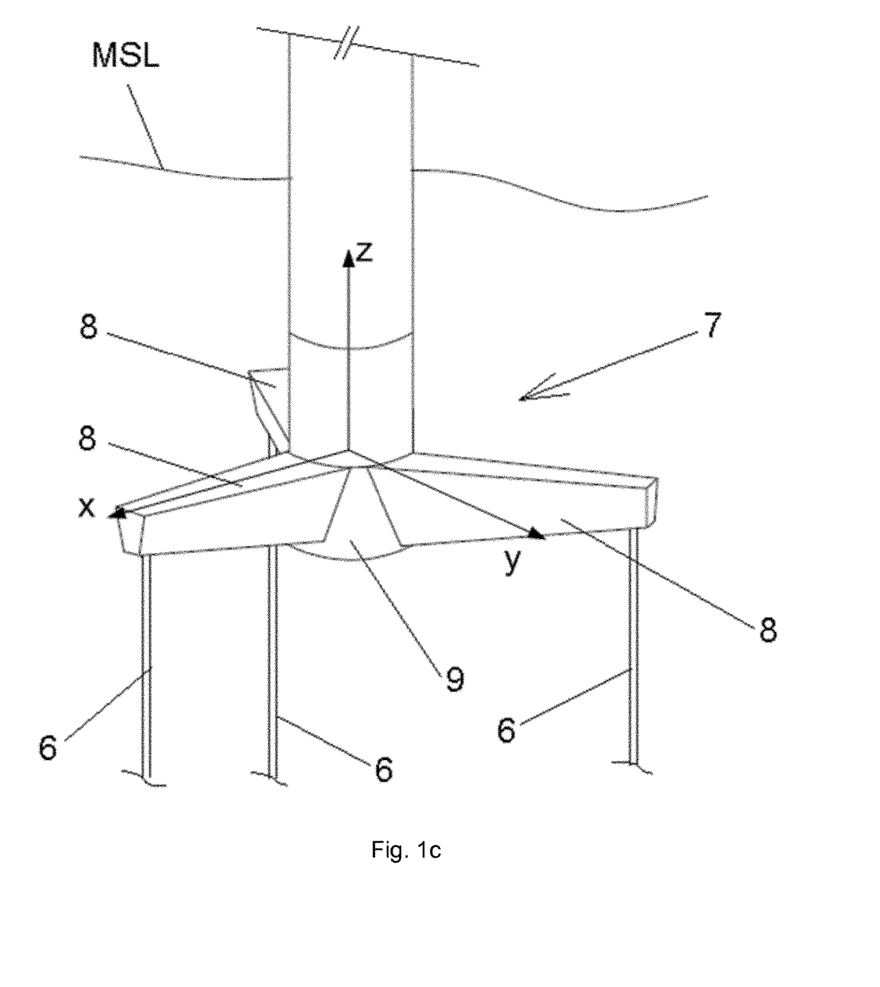

FIG. 1c illustrates an alternative example of a tension leg platform structure carrying a wind turbine and incorporating a different floater tank 7. Contrarily to the previous example, the three braces 8 are provided as part of the buoyancy structure and are destined to be below the mean sea level MSL. The three braces thus contribute to providing excess buoyancy.

In some examples, a water tank may be provided in a central hub portion 9 at the bottom of the buoyancy structure. In other examples, one or more water tanks may be provided in each of the braces 8 arranged below the mean sea level. In these examples, an increased control of the tension in each of the mooring lines 6 may be provided. It is thus possible to only increase or decrease the amount of water in the water tank(s) of only one of the braces, or e.g. in two of the braces. By selectively controlling excess buoyancy of each of the braces, more appropriate responses to specific load conditions may be provided.

Figure 2A:
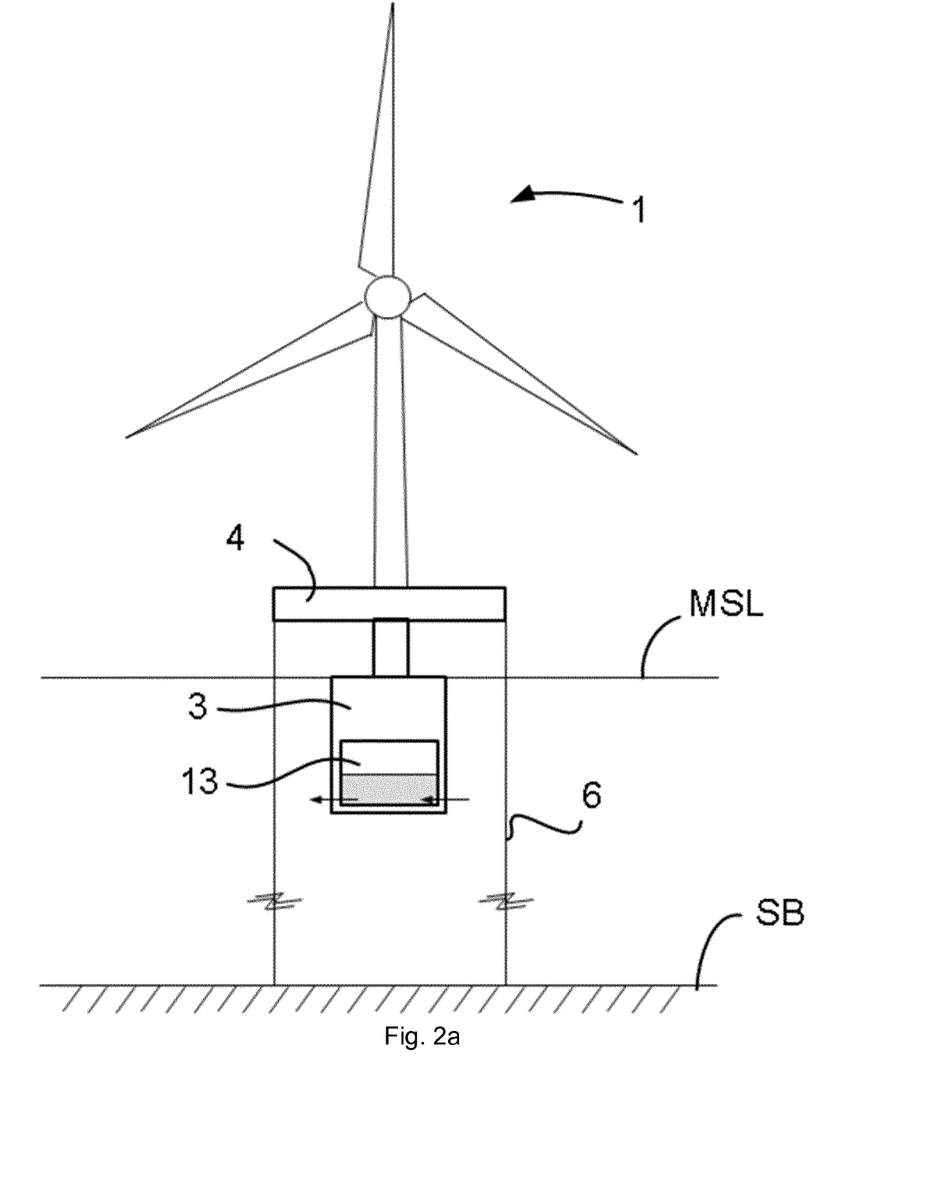
FIGS. 2a-2c schematically illustrate how varying loads may result in varying tension in mooring lines of an offshore structure.
Figure 2B:
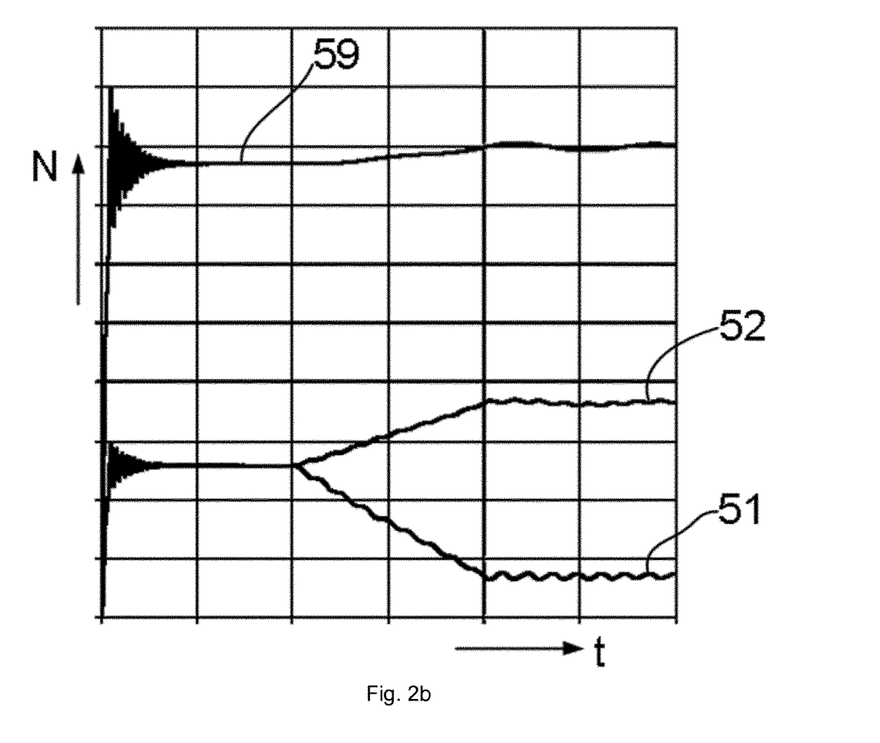
Figure 2C:
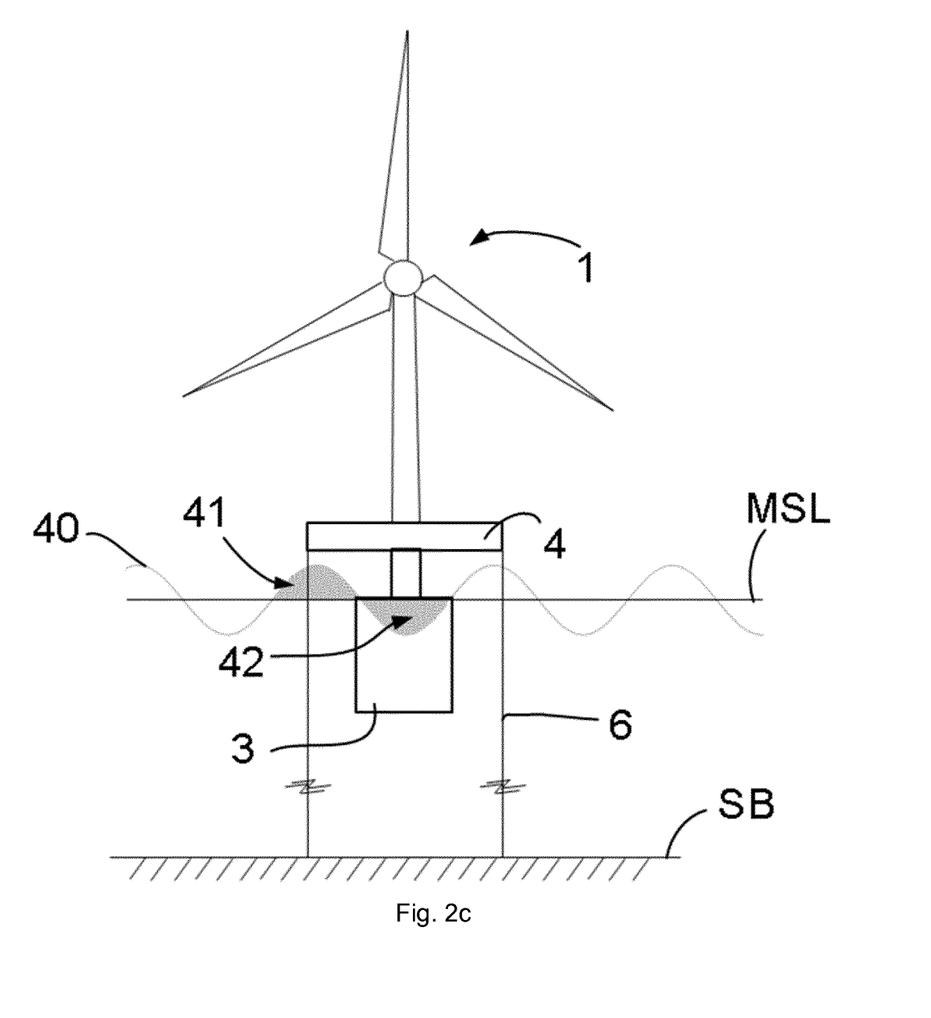

FIGS. 2a-2c illustrate the effect of some loads on the tension in the mooring lines. FIG. 2a illustrates an example of a floating wind turbine. A water tank 13 is illustrated in floater tank 3 of the buoyancy structure of the wind turbine. Also in this case, a TLP configuration is shown.

In FIG. 1b, a reference coordinate system was illustrated, in which the x-axis corresponds to the instantaneous wind direction, the z-axis corresponds substantially to the longitudinal axis of the wind turbine tower and the y-axis is perpendicular to both these axes.

The loads that may be more dangerous when it comes to the tension in the mooring lines and thereby the stability of the structure may occur are along the x-axis in the situation of FIG. 1b. That is, along the axis substantially corresponding to one of the three braces at which a mooring line is attached. This axis thus lies in between the other two braces. Along this direction, and particularly when the aerodynamic loads are in a positive direction of the x-axis, the mooring line of this particular brace may be compressed. The most relevant aerodynamic loads may correspond to thrust on the blades, and a "push" on the wind turbine as a whole.

FIG. 2b illustrates how the tension in the three mooring lines may vary in response to such loads. Reference sign 51 indicates the tension in the mooring line at or near the end of the brace along the x-axis. Reference sign 52 indicates the tension in the other mooring lines. Reference sign 59 indicates the excess buoyancy of the system as a whole, which naturally corresponds to the sum of the tensions in the mooring lines.

A potentially dangerous situation may thus arise when the wind direction substantially corresponds to a direction of one of the braces. To further complicate matters, e.g. wave loads also need to be taken into account. The direction of wave loads may or may not correspond to the wind direction at any given moment. Regardless of whether the direction of the wave loads corresponds to the wind direction or not, the wave loads may have an aggravating effect on the stability of the offshore structure.

In FIG. 2c, a standard substantially sinusoidal wave form 40 is schematically illustrated. The wave from 40 may include troughs 42 and crests 41. During crests 41, the wave may be at a peak, and the offshore structure may be more submerged than the submersion corresponding to Mean Sea Level MSL. During crests, additional excess buoyancy is thus generated, automatically increasing the tension in the mooring lines. During troughs on the other hand, there is less excess buoyancy, automatically decreasing the tension in the mooring lines. It thus becomes clear that depending on the wave loads and wind loads, the stability of the offshore structure may be jeopardized.

In this sense, also the influence of tides can in some cases be very important. Some meters of difference in height of the sea level between low tide ("ebb") and high tide ("flood") may occur. Depending on the offshore structure and depending on the difference in sea level, this may have a significant impact on the excess buoyancy of the offshore structure and thus on the tension of the mooring lines.

In examples of the present invention, methods and systems are provided that may actively respond to varying load situations and adjust the mass of the structure and thereby the excess buoyancy accordingly. In other examples, additionally or alternatively, the centre of gravity may be changed to respond to varying circumstances.

Figure 2D:
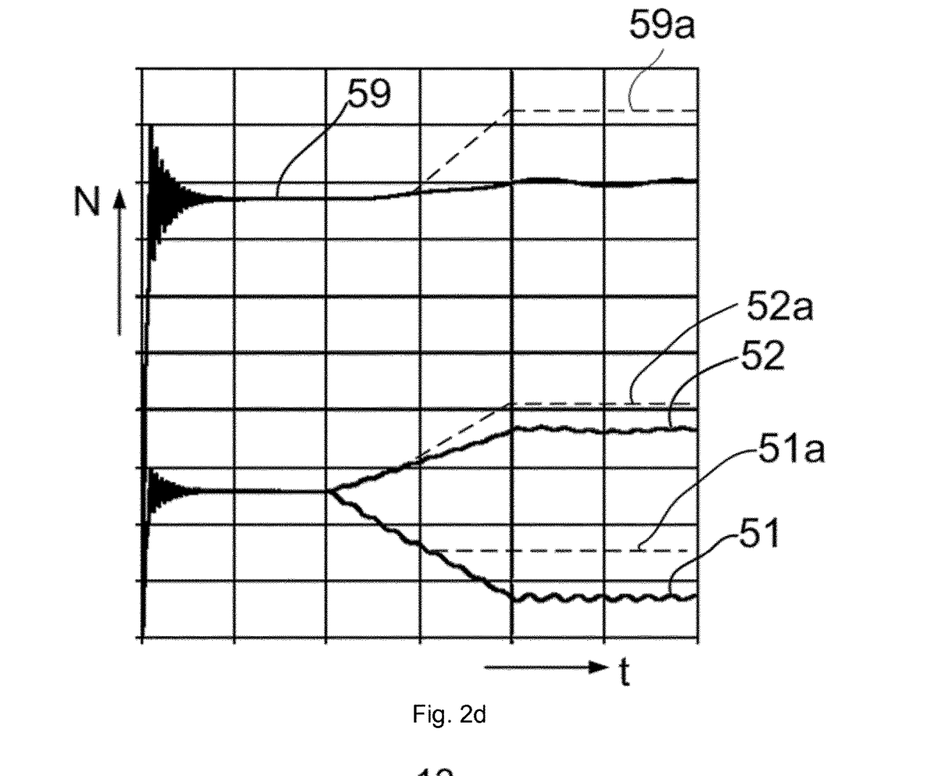
FIG. 2d schematically illustrates how in examples of the invention the tension in the mooring lines may be changed.

FIG. 2d serves to illustrate how stability of the system may be improved using examples of the present invention. Sensors could be used that measure the tension in the mooring lines. The decrease in tension for one of the mooring lines may be registered. As the tension decreases to what may be considered a "problematic" or "unsafe" level, one or more water tanks may be emptied. The excess buoyancy 59a may thus increase which will increase the tensions 51a and 52a in the mooring lines as well.

Figure 3:
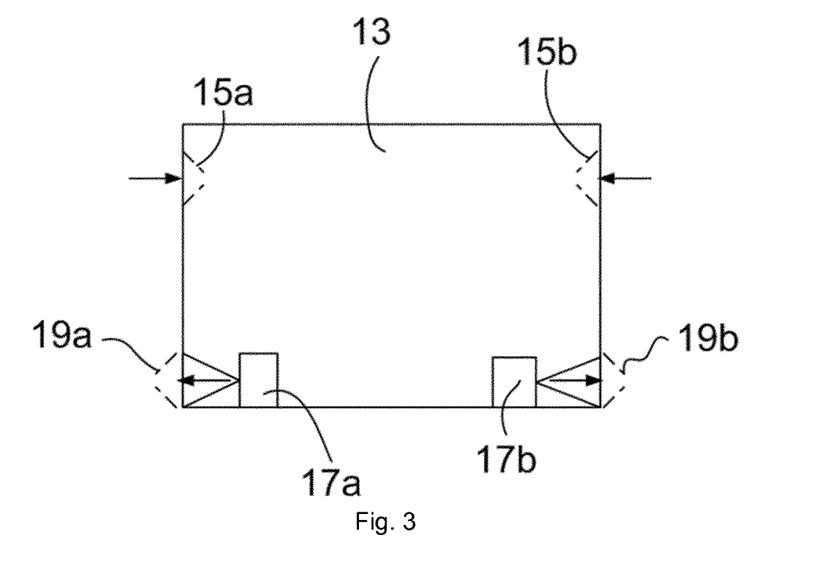
FIG. 3 illustrates an example of water tank that may be used in various examples of the present invention.

FIG. 3 illustrates a very schematic example of a water tank that may be used in various examples of the present invention. A water tank 13 may comprise one or more one-way valves 15a and 15b for filling the tank with water. The water tank may furthermore comprise one-way valves 19a and 19b substantially at the bottom of the tank, and one or more pumps, e.g. bilge pumps 17a and 18b for evacuating water from the tank.

One of these tanks, or a plurality of these tanks may be arranged in the floating offshore structure.

Figure 4A:
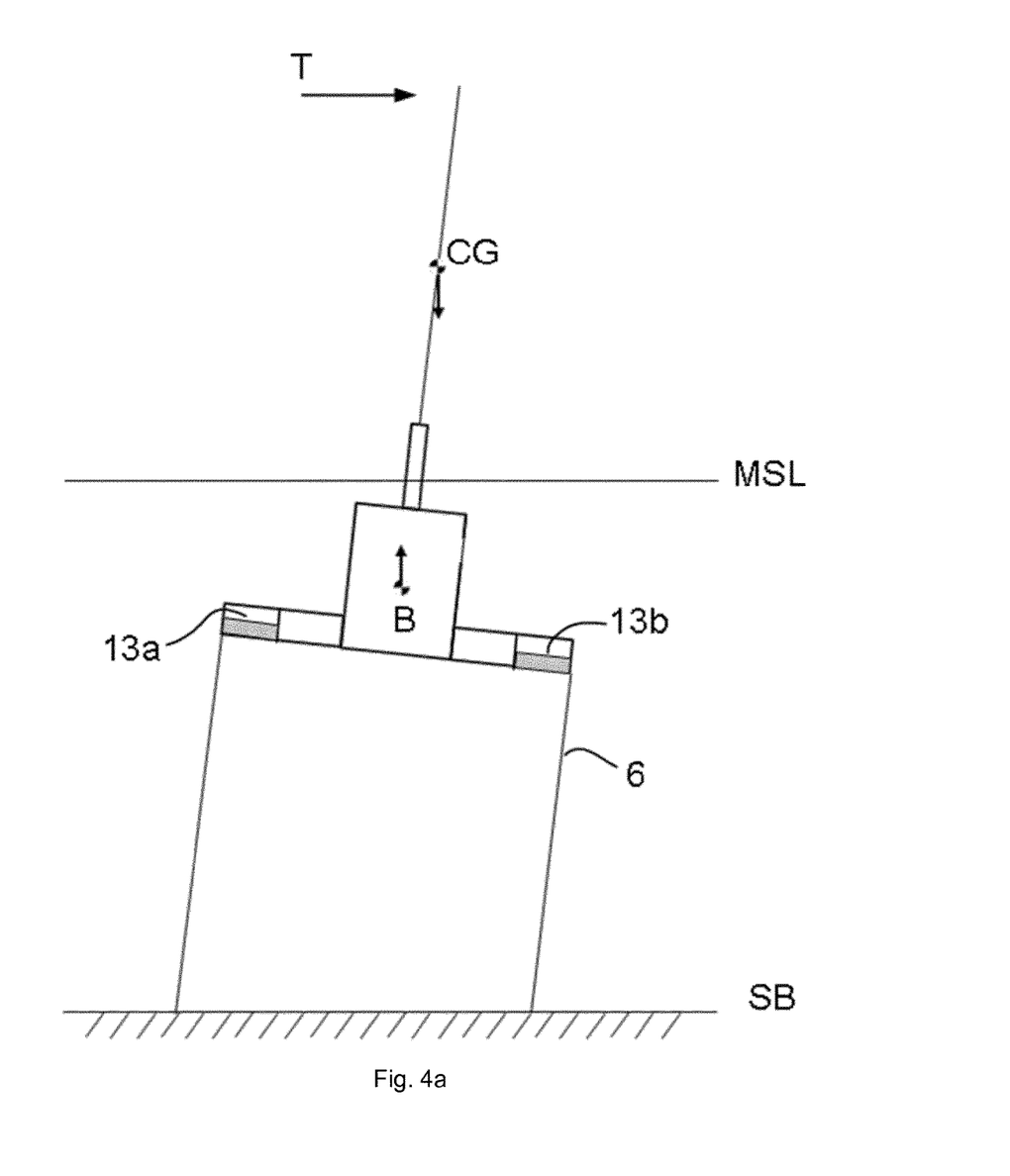
FIGS. 4a and 4b illustrate further examples of floating offshore structures.
Figure 4B:
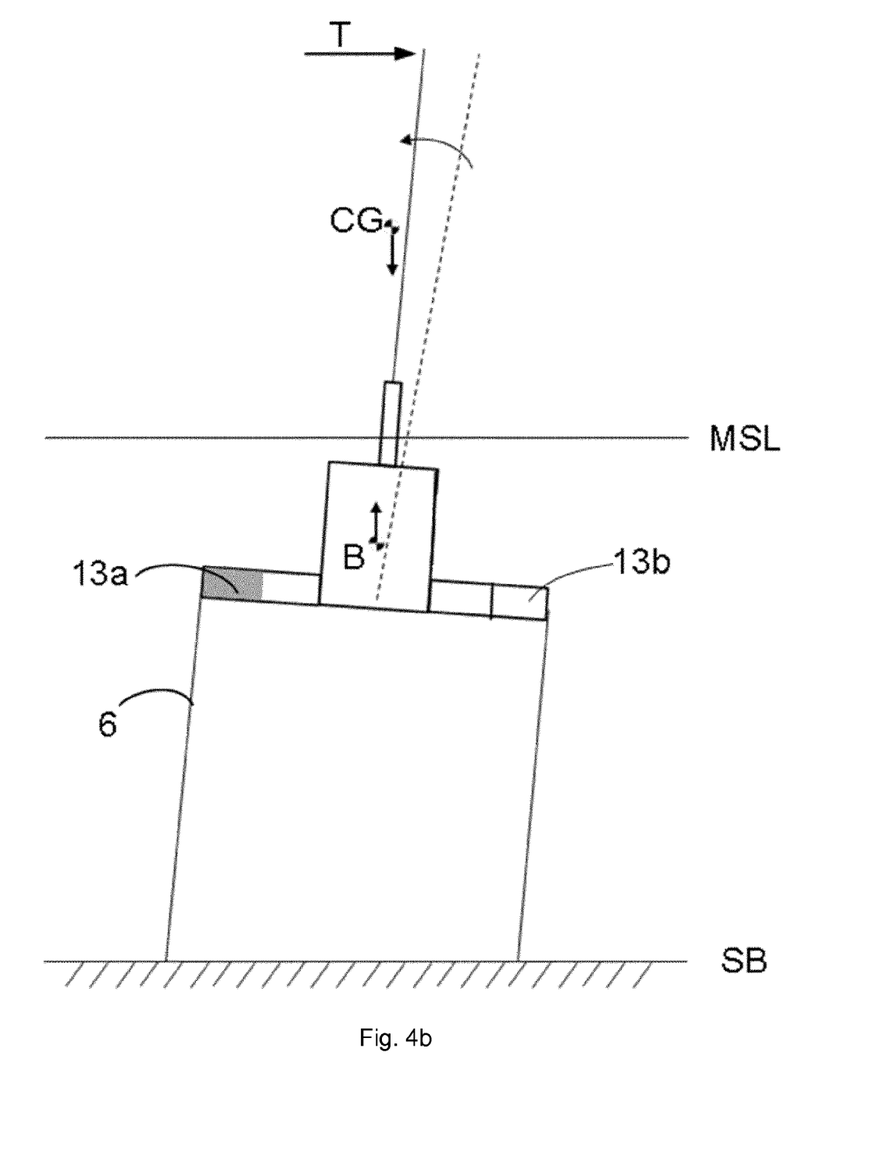

FIGS. 4a and 4b serve to illustrate various aspects of having a partitioned water tank or a plurality of separate water tanks inside a buoyancy structure. In FIG. 4a, a floating offshore structure is illustrated that suffers a wind thrust T. This may typically be the case in a wind turbine.

Also schematically indicated in FIG. 4a are two partitions 13a and 13b of a water tank, which at that particular moment are about half full.

The thrust T pushes against the offshore structure, which may tilt in response as shown in FIG. 4a. FIG. 4a further indicates other main forces acting on the offshore structure. On the one hand, the upwards acting buoyancy B is indicated. On the other hand, the downwards acting weight of the structure is shown, which may be assumed to act on the centre of gravity CG.

One of the mooring lines, in FIG. 4a is being compressed by the loads acting on the system. And the mooring lines can only function properly when in tension.

In response to the loads, a partition 13a of a water tank may be filled with water, and at the same, the partition 13b of the water tank may be emptied.

In FIG. 4b, the result is shown, by changing the centre of gravity of the structure, the offshore structure may become less inclined. It is to be noted that this effect can be reached without substantially changing the overall mass of the structure. Merely changing the centre of gravity may be enough.

In other examples, in addition to changing the centre of gravity, also the mass of the structure may be changed. For example, in the case of FIG. 4a, only tank 13b could be emptied, thus increasing the excess buoyancy and shifting the centre of gravity.

Even though in this example, reference was made to partitions 13a and 13b of a water tank, the above described effects and advantages could equally well be achieved with separate water tanks 13a and 13b.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method for controlling stability of a tension leg platform structure, the tension leg platform structure having a buoyancy structure providing excess buoyancy and a plurality of mooring lines, the buoyancy structure including one or more water tanks, the method comprising:
   measuring a tension in at least one mooring line of the plurality of mooring lines;
   changing a quantity of water in one or more of the water tanks based on the measured tension in the at least one mooring line of the plurality of mooring lines, in order:
   to vary a mass of the tension leg platform structure;
   to vary a center of gravity of the tension leg platform structure; or
   to vary both the center of gravity and the mass of the tension leg platform structure.

2. The method according to claim 1, wherein the quantity of water in one or more of the water tanks is changed in response to one or more loads on the tension leg platform structure.

3. The method according to claim 2, wherein the mass of the tension leg platform structure is varied in response to a measured oscillation in order to reduce the measured oscillation.

4. The method according to claim 1, wherein the tension leg platform structure comprises a wind turbine.

5. A floating offshore structure comprising:
   a wind turbine,
   a tension leg platform including a plurality of radially outwardly extending braces,
   a mooring line attached to each of the braces at one end and to a seabed at the other end,
   a buoyancy structure having one or more water tanks for providing excess buoyancy, and
   a control system for increasing and decreasing a quantity of water in one or more of the water tanks based on a measured tension in at least one of the mooring lines.

6. The floating offshore structure according to claim 5, further comprising one or more sensors to measure the tension in one or more of the mooring lines.

7. The floating offshore structure according to claim 5, wherein one or more of the water tanks comprise
   at least one one-way valve for increasing the quantity of water in the floater tank, and
   at least one one-way valve for decreasing the quantity of water in the floater tank.

8. The floating offshore structure according to claim 5, wherein one or more of the water tanks comprises two or more partitions.

9. The floating offshore structure according to claim 5, wherein the braces are arranged to remain under a mean sea level.

10. The floating offshore structure according to claim 9, wherein each of the braces comprises one or more of the water tanks and the control system is adapted to increase and decrease the quantity of water in each of the water tanks.

11. The floating offshore structure according to claim 5, wherein the braces are arranged to remain above a mean sea level.

12. The floating offshore structure according to claim 5, comprising three braces.

13. The floating offshore structure according to claim 5, wherein the control system is configured to maintain the water tanks at least partially filled with water under standard operating conditions.

14. The method according to claim 4, wherein a quantity of water is changed in one or more of the water tanks while the wind turbine is operating.

15. The method according to claim 3, wherein the mass of the tension leg platform structure is increased in order to reduce the tension in the mooring lines.

16. A method for controlling stability of a tension leg platform structure, the tension leg platform structure having
   a wind turbine,
   a buoyancy structure providing excess buoyancy,
   a plurality of mooring lines, and
   the buoyancy structure including one or more water tanks,
   the method comprising:
   operating the wind turbine;
   measuring a tension in at least one mooring line of the plurality of mooring lines; and reducing a quantity of water in one or more of the water tanks based on the measured tension in the at least one mooring line of the plurality of mooring lines in order to maintain a tension in the mooring lines above a minimum tension.

17. The method according to claim 16, further comprising changing a centre of gravity of the tension leg platform structure.

\* \* \* \* \*